US010585995B2

(12) United States Patent
Barak et al.

(10) Patent No.: US 10,585,995 B2
(45) Date of Patent: *Mar. 10, 2020

(54) REDUCING CLOCK POWER CONSUMPTION OF A COMPUTER PROCESSOR

(71) Applicant: International Business Machines Corporation, Armonk, NY (US)

(72) Inventors: Erez Barak, Kfar Saba (IL); Giora Biran, Zichron-Yaakov (IL); Amir Turi, Ramat Gan (IL); Osher Yifrach, Modiin (IL)

(73) Assignee: International Business Machines Corporation, Armonk, NY (US)

( * ) Notice: Subject to any disclaimer, the term of this patent is extended or adjusted under 35 U.S.C. 154(b) by 248 days.

This patent is subject to a terminal disclaimer.

(21) Appl. No.: 15/632,642

(22) Filed: Jun. 26, 2017

(65) Prior Publication Data
US 2018/0373610 A1 Dec. 27, 2018

(51) Int. Cl.
*G06F 9/44* (2018.01)
*G06F 13/10* (2006.01)
(Continued)

(52) U.S. Cl.
CPC ............ *G06F 17/5031* (2013.01); *G06F 1/10* (2013.01); *G06F 1/3203* (2013.01); *G06F 1/324* (2013.01); *G06F 1/3228* (2013.01); *G06F 1/3287* (2013.01); *G06F 11/3409* (2013.01); *G06F 17/505* (2013.01); *G06F 17/5022* (2013.01); *G06F 1/329* (2013.01); *G06F 9/3869* (2013.01);
(Continued)

(58) Field of Classification Search
None
See application file for complete search history.

(56) References Cited

U.S. PATENT DOCUMENTS

| 4,727,545 A | 2/1988 | Glackemeyer et al. |
| 6,745,377 B2 | 6/2004 | Baumgartner et al. |
| (Continued) | | |

OTHER PUBLICATIONS

Barak et al., "Reducing Clock Power Consumption of a Computer Processor," U.S. Appl. No. 15/903,697, filed Feb. 23, 2018.
(Continued)

*Primary Examiner* — Cedric Johnson
(74) *Attorney, Agent, or Firm* — Mark Bergner

(57) ABSTRACT

Reducing clock power consumption of a computer processor by simulating, in a baseline simulation of a computer processor design using a software model of the computer processor design, performance of an instruction by the computer processor design, to produce a baseline result of the instruction, and identifying a circuit of the computer processor design that receives a clock signal during performance of the instruction, and in a comparison simulation of the computer processor design using the software model of the computer processor design, simulating performance of the instruction by the computer processor design while injecting a corruption signal into the circuit, to produce a comparison result of the instruction, and designating the circuit for clock gating when processing the instruction, if the comparison result of the instruction is identical to the baseline result of the instruction.

8 Claims, 4 Drawing Sheets

(51) Int. Cl.

| | | |
|---|---|---|
| *G06F 13/12* | (2006.01) | |
| *G06F 17/50* | (2006.01) | |
| *G06F 1/10* | (2006.01) | |
| *G06F 1/3287* | (2019.01) | |
| *G06F 1/3203* | (2019.01) | |
| *G06F 1/3228* | (2019.01) | |
| *G06F 1/324* | (2019.01) | |
| *G06F 11/34* | (2006.01) | |
| *G06F 1/329* | (2019.01) | |
| *G06F 9/38* | (2018.01) | |

(52) U.S. Cl.
CPC ...... *G06F 2217/02* (2013.01); *G06F 2217/62* (2013.01); *G06F 2217/68* (2013.01); *G06F 2217/78* (2013.01); *G06F 2217/84* (2013.01)

(56) References Cited

U.S. PATENT DOCUMENTS

| | | | |
|---|---|---|---|
| 7,080,334 | B2 | 7/2006 | Fan et al. |
| 7,542,728 | B2 | 6/2009 | Bitran et al. |
| 7,712,062 | B2 | 5/2010 | Ly et al. |
| 8,244,515 | B2 | 8/2012 | Fernsler et al. |
| 9,003,339 | B2 | 4/2015 | Jensen et al. |
| 9,311,102 | B2 | 4/2016 | Shah et al. |
| 2003/0192017 | A1 | 10/2003 | Baumgartner et al. |
| 2003/0192018 | A1 | 10/2003 | Baumgartner et al. |
| 2005/0028118 | A1* | 2/2005 | Kapoor ............... G06F 17/505 716/103 |
| 2008/0301604 | A1 | 12/2008 | Itskovich et al. |
| 2009/0055668 | A1* | 2/2009 | Fernsler ............... G06F 1/3203 713/322 |
| 2009/0282377 | A1* | 11/2009 | Tamiya ............... G06F 17/5031 716/113 |
| 2010/0058146 | A1 | 3/2010 | Weingarten et al. |
| 2011/0218779 | A1* | 9/2011 | Palisetti ............... G06F 17/10 703/2 |
| 2012/0166168 | A1* | 6/2012 | Srinivasan ........... G06F 17/505 703/14 |
| 2014/0258948 | A1 | 9/2014 | Jensen et al. |
| 2017/0351318 | A1 | 12/2017 | Gu et al. |
| 2017/0357302 | A1 | 12/2017 | Dorsey et al. |
| 2018/0107264 | A1 | 4/2018 | Liu et al. |

OTHER PUBLICATIONS

Accelerated Examination Support Document, dated Feb. 15, 2018, 14 pages.

List of IBM Patents or Patent Applications Treated as Related, Filed Feb. 23, 2018, 2 pages.

Barak et al., "Reducing Clock Power Consumption of a Computer Processor," U.S. Appl. No. 15/857,699, filed Dec. 29, 2017.

List of IBM Patents or Patent Applications Treated as Related, Dated Dec. 28, 2017, 2 pages.

Benini et al., "A Refinement Methodology for Clock Gating Optimization at Layout Level in Digital Circuits," Journal of Low Power Electronics, vol. 6, No. 1, Apr. 2010, pp. 44-55, (abstract provided), American Scientific Publishers. DOI: 10.1166/jolpe.2010.1055.

Pandey et al., "Clock Gating Aware Low Power ALU Design and Implementation on FPGA," International Journal of Future Computer and Communication, vol. 2, No. 5, Oct. 2013, pp. 461-465. DOI: 10.7763/IJFCC.2013.V2.206.

Wimer et al., "The Optimal Fan-Out of Clock Network for Power Minimization by Adaptive Gating," IEEE Transactions on Very Large Scale Integration (VLSI) Systems, vol. 20, No. 10, Oct. 2012, pp. 1772-1780. DOI: 10.1109/TVLSI.2011.2162861.

* cited by examiner

REDUCING CLOCK POWER CONSUMPTION OF A COMPUTER PROCESSOR

BACKGROUND

In computer processor design, clock gating is used to conserve power by preventing a circuit from receiving the clock signal if that circuit is not required for a particular operation. Ideally, every circuit that is not required for a particular operation should be clock gated for that operation in order to receive maximum benefit from clock gating. However, determining which circuits may be clock gated for various operations is a significant design challenge.

SUMMARY

In one aspect of the disclosure a method is provided for reducing clock power consumption of a computer processor, the method including, in a baseline simulation of a computer processor design using a software model of the computer processor design, simulating performance of an instruction by the computer processor design, to produce a baseline result of the instruction, and identifying a circuit of the computer processor design that receives a clock signal during performance of the instruction, and in a comparison simulation of the computer processor design using the software model of the computer processor design, simulating performance of the instruction by the computer processor design while injecting a corruption signal into the circuit, to produce a comparison result of the instruction, and designating the circuit for clock gating when processing the instruction, if the comparison result of the instruction is identical to the baseline result of the instruction.

In other aspects of the disclosure, systems and computer program products embodying the disclosure are provided.

BRIEF DESCRIPTION OF THE DRAWINGS

Aspects of the disclosure will be understood and appreciated more fully from the following detailed description taken in conjunction with the appended drawings in which.

DETAILED DESCRIPTION

Figure 1A:
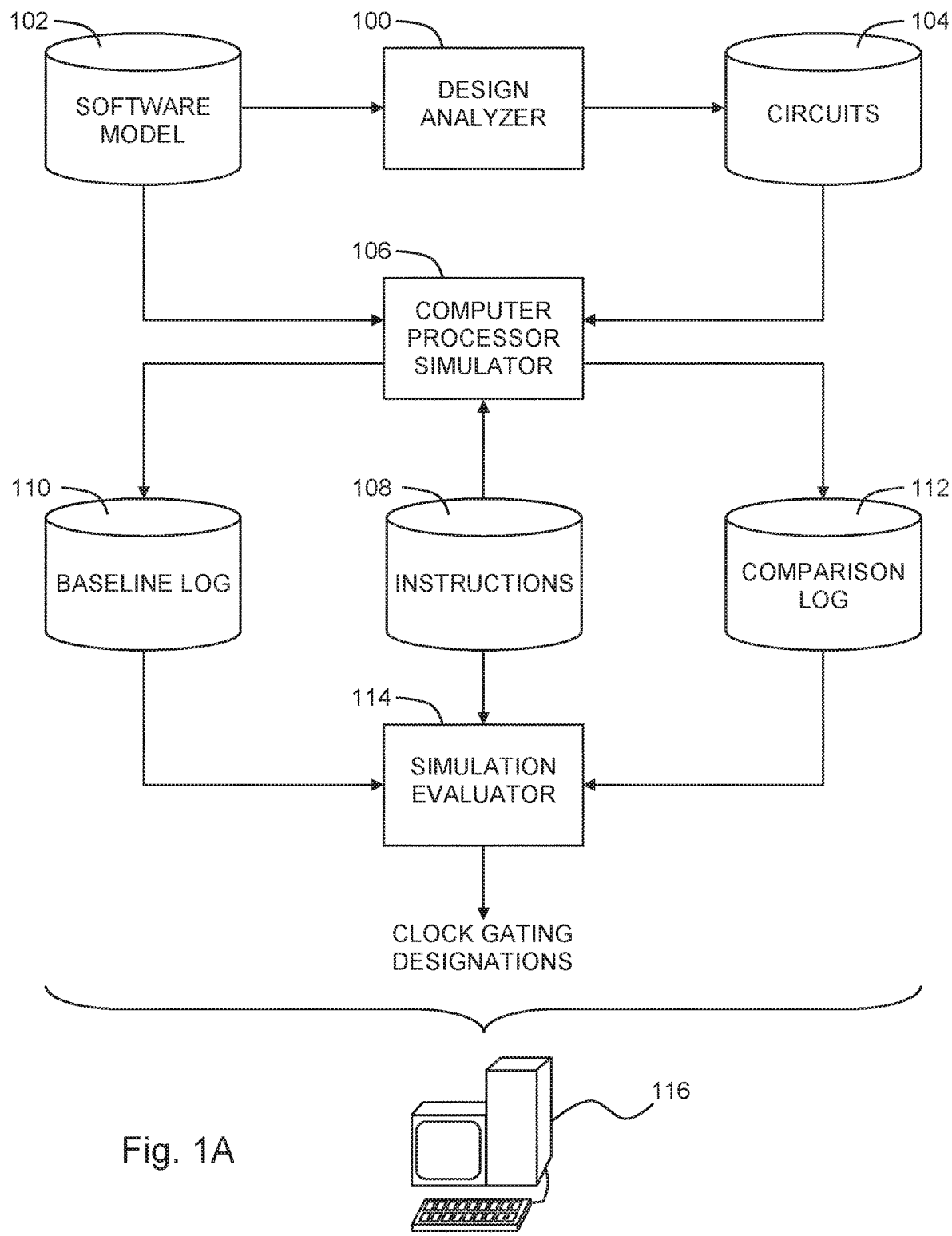
FIG. 1A is a simplified conceptual illustration of a system for reducing clock power consumption of a computer processor, constructed and operative in accordance with an embodiment of the disclosure.

Reference is now made to FIG. 1A, which is a simplified conceptual illustration of a system for reducing clock power consumption of a computer processor, constructed and operative in accordance with some embodiments of the present disclosure. In the system of FIG. 1A, a design analyzer 100 is configured to analyze a model 102 of a computer processor design, such as where software model 102 is constructed in accordance with conventional techniques using a hardware description language, such as the VHSIC Hardware Description Language (VHDL). Design analyzer 100 is, in some embodiments, configured to identify a set of circuits 104 that includes any, and in some embodiments, every circuit in model 102 that receives a clock signal.

A computer processor simulator 106 is configured, in accordance with conventional techniques, to perform a baseline simulation of the computer processor design using model 102. In one embodiment computer processor simulator 106 is configured to perform the baseline simulation by simulating the processing of a predefined set of instructions 108 and producing a baseline log 110, where baseline log 110, in some embodiments, indicates, for each instruction 108 processed during the baseline simulation, which circuits 104 received a clock signal, and at which cycles, during the simulated processing of the instruction, and the result of the instruction, hereinafter referred to as the baseline result of the instruction. For each type of instruction in instructions 108, instructions 108, in some embodiments, includes multiple versions of the instruction, where each version includes different operands and/or operand values, just in case different versions of an instruction cause different circuits 104 to receive a clock signal during the simulated processing of the instruction.

Figure 1B:
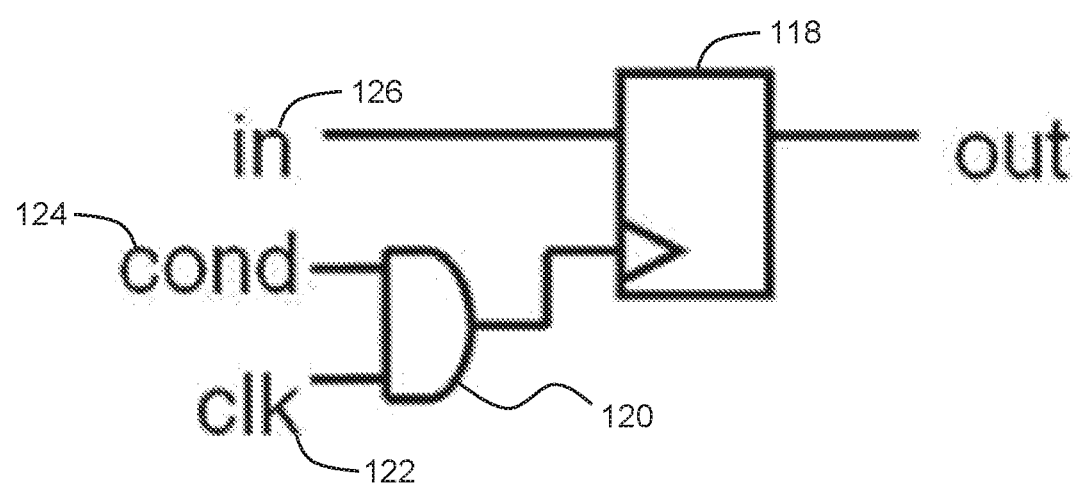
FIG. 1B is a circuit diagram illustrating an exemplary application of the disclosure.

Computer processor simulator 106 is further configured to perform multiple comparison simulations of the computer processor design using model 102, where a different comparison simulation is performed for any, and, in some embodiments, each, of the instructions in instructions 108, and for any, and, in some embodiments, each, of the circuits 104 that received a clock signal when the instruction was processed during the baseline simulation. During a given comparison simulation, the processing of one of instructions 108 is simulated, during which processing a corruption signal is injected into one of the circuits 104 that received a clock signal when the instruction was processed during the baseline simulation. For example, in an exemplary circuit 118 shown in FIG. 1B, an AND gate 120 allows a clock signal 122 to reach circuit 118 due to a condition signal 124 being active at a specific cycle when processing a given instruction during the baseline simulation. During a comparison simulation, the same instruction is processed, and one of the following corruption signals are injected into a data bus 126 of circuit 118 at the cycle when clock signal 122 reaches circuit 118, in some embodiments, formatted to match the width of the bus:

| | |
|---|---|
| 0x5555... | (binary 01010101...) |
| 0xAAAA... | (binary 10101010...) |
| 0xFFFF... | (binary 11111111...) |
| 0x0000... | (binary 00000000...) |

The comparison simulation of the same instruction is, in some embodiments, repeated such that a different corruption signal is injected during each such simulation. Computer processor simulator 106, in some embodiments, produces a comparison log 112, which, in some embodiments, indicates, for each instruction 108 processed during the comparison simulations, which circuit 104 received a corruption signal during the simulated processing of the instruction, and the result of the instruction, hereinafter referred to as the comparison result of the instruction.

A simulation evaluator 114 is configured to compare, for any given one of instructions 108 that was processed during a comparison simulation, the comparison result produced by the given instruction to the baseline result produced by the same instruction during the baseline simulation. If the comparison result of the instruction is identical to the baseline result of the same instruction, then the circuit 104 into which a corruption signal was injected during the comparison simulation of the instruction is, in some embodiments, designated by simulation evaluator 114 for clock gating for that instruction. Simulation evaluator 114, in some embodiments, performs this comparison for each of the comparison simulations. Simulation evaluator 114 is, in some embodiments, configured, in accordance with conventional techniques, to provide a report indicating which circuits 104 are designated for clock gating and for which instructions.

Any of the elements shown in FIG. 1A are, in some embodiments, implemented by one or more computers in computer hardware and/or in computer software embodied in a non-transitory, computer-readable medium in accordance with conventional techniques, such as where any of the elements shown in FIG. 1A are hosted by a computer 116.

Figure 2:
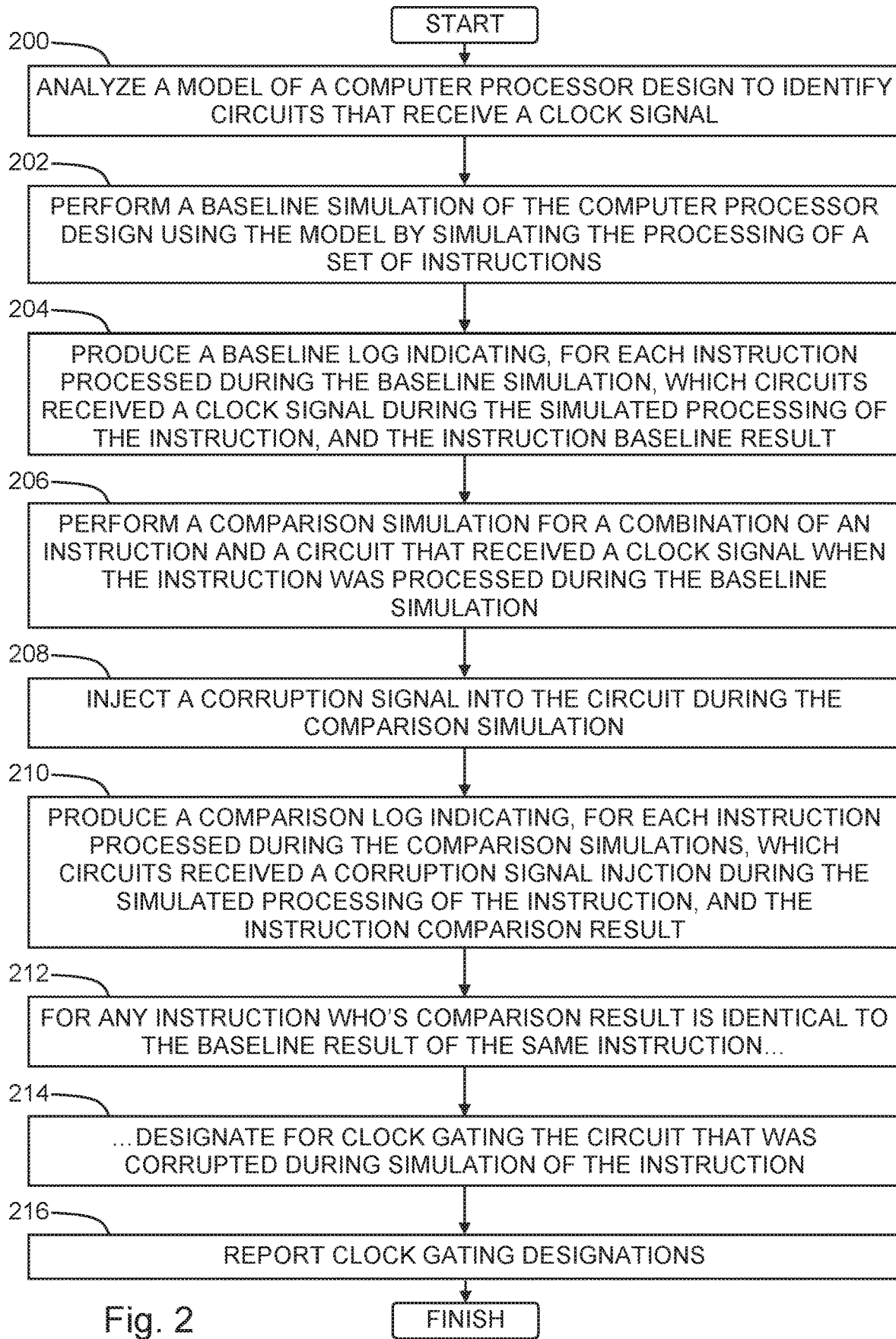
FIG. 2 is a simplified flowchart illustration of an exemplary method of operation of the system of FIG. 1, operative in accordance with an embodiment of the disclosure.

Reference is now made to FIG. 2, which is a simplified flowchart illustration of an exemplary method of operation of the system of FIG. 1A, operative in accordance with some embodiments. In the method of FIG. 2, a model of a computer processor design is analyzed to identify any circuits in the computer processor design that receive a clock signal (step 200). A baseline simulation of the computer processor design is performed using the model, in which the processing of a predefined set of instructions is simulated (step 202) and a baseline log is produced indicating, for each instruction processed during the baseline simulation, which circuits received a clock signal, and at which cycles, during the simulated processing of the instruction, and the baseline result of the instruction (step 204). A comparison simulation is performed for a combination of an instruction and a circuit that received a clock signal when the instruction was processed during the baseline simulation (step 206). During the comparison simulation, a corruption signal is injected into the circuit during a clock-receiving cycle (step 208). Steps 206 and 208 are, in some embodiments, performed for each unique combination of an instruction and a circuit that received a clock signal when the instruction was processed during the baseline simulation. A comparison log is produced indicating, for each instruction processed during the comparison simulations, which circuit received a corruption signal injection during the simulated processing of the instruction, and the comparison result of the instruction (step 210). For any instruction who's comparison result is identical to the baseline result of the same instruction (step 212), the circuit into which a corruption signal was injected during the comparison simulation of the instruction is designated for clock gating for that instruction (step 214), and a report is provided indicating which circuits are designated for clock gating and for which instructions (step 216).

The method of FIG. 2 thus identifies, for a given instruction, any circuit that is activated by receiving a clock signal during a baseline simulated processing of the instruction. And by corrupting the circuit during a comparison simulated processing of the instruction, and determining that the corruption does not change the result of the instruction, the method of FIG. 2 thus determines that the circuit has no effect on the instruction being simulated, and therefore the circuit may be designated for clock gating for that instruction, such that it will no longer be activated when the instruction is processed, thereby conserving power.

Figure 3:
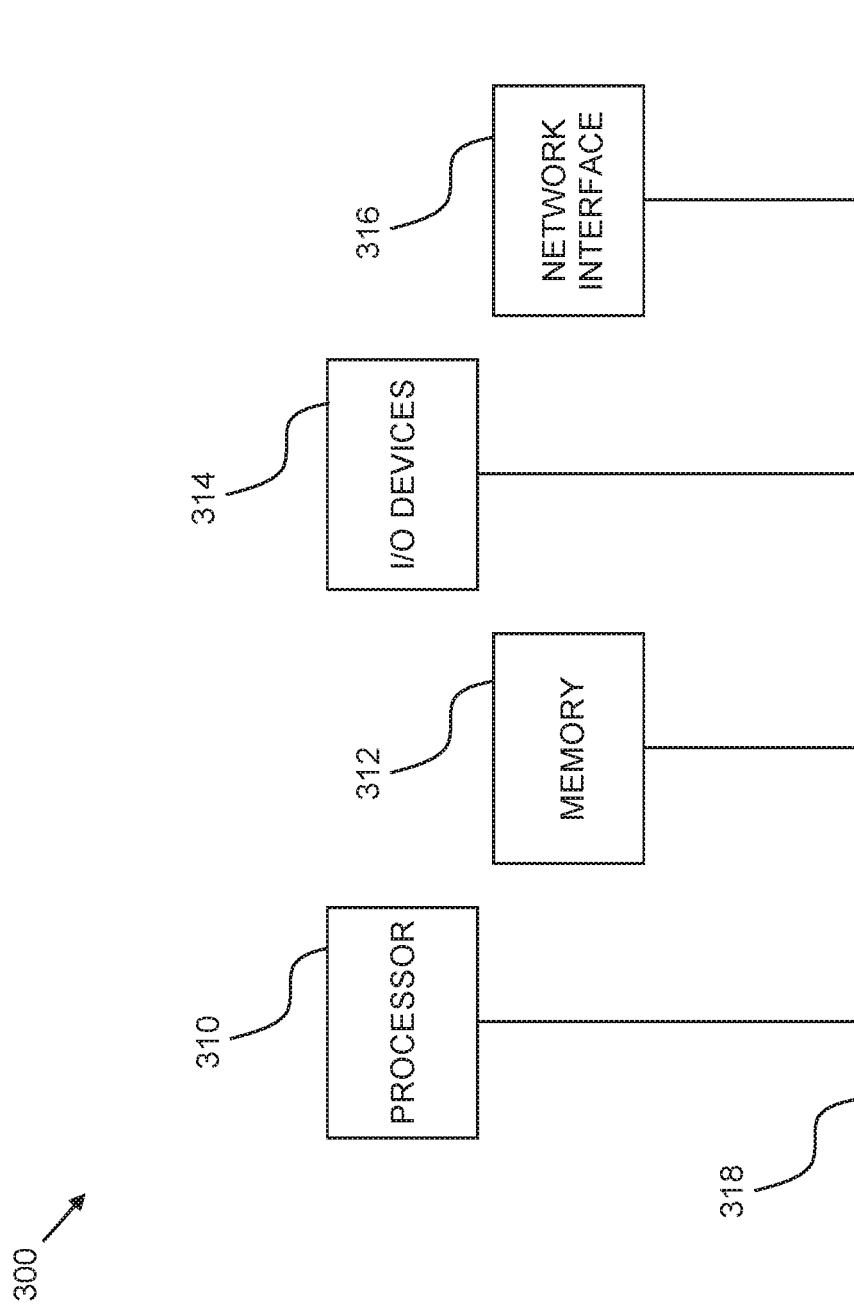
FIG. 3 is a simplified block diagram illustration of an exemplary hardware implementation of a computing system, constructed and operative in accordance with an embodiment of the disclosure.

Referring now to FIG. 3, block diagram 300 illustrates an exemplary hardware implementation of a computing system in accordance with which one or more components/methodologies of the disclosure (e.g., components/methodologies described in the context of FIGS. 1A-2) which may be implemented, according to some embodiments. Some embodiments may include a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the disclosure may include a system, a method, and/or a computer program product. The computer program product may include a computer readable storage medium (or media) having computer readable program instructions thereon for causing a processor to carry out aspects of the disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the disclosure.

Some embodiments of the disclosure are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for reducing clock power consumption of a computer processor, the system comprising:
    a simulator processor;
    a computer processor simulator that runs on the simulator processor, the simulator processor being configured to:
        perform a baseline simulation of a computer processor design using a software model of the computer processor design by the simulator processor being further configured to:
            simulate performance of a computer processor design instruction (CPDI) by the computer processor design, to produce a baseline result of the CPDI; and
            identify a circuit of the computer processor design that receives a clock signal during performance of the CPDI; and
        perform a comparison simulation of the computer processor design using the software model of the computer processor design, by the simulator processor that is further configured to:
            simulate performance of the CPDI by the computer processor design while injecting a corruption signal into the circuit; and
            produce a comparison result of the CPDI; and
    a simulation evaluator that runs on the simulator processor, the simulator processor being further configured to designate the circuit for clock gating when processing the CPDI when the comparison result of the CPDI is identical to the baseline result of the CPDI;
    wherein:
    a corruption signal set comprises corruption signal elements that are a width of the data bus, the corruption signal set comprising:
        a first corruption signal element comprising an alternating set of 0s and 1s beginning with 0;

a second corruption signal element comprising an alternating set of 0s and 1s beginning with 1;
a third corruption signal element comprising all 0s; and
a fourth corruption signal element comprising all 1s;
the computer processor simulator is configured to perform multiple iterations of the comparison simulation using each of the corruption signal elements of the corruption signal set; and
in each of the iterations, a different corruption signal in the corruption signal set is injected into the circuit; and
the simulator processor is further configured to designate the circuit for clock gating when processing the CPDI when the comparison result of the CPDI is identical to the baseline result of the CPDI for each of the iterations using each of the corruption signal elements in the corruption signal set.

2. The system of claim 1, wherein the computer processor simulator is configured to perform multiple iterations of the baseline and comparison simulations for a corresponding plurality of different CPDIs.

3. The system of claim 1, further comprising a design analyzer configured to analyze the software model of the computer processor design and to identify in the software model any circuit configured to receive a clock signal.

4. The system of claim 1, wherein the simulation evaluator is configured to:
compare the comparison result of the CPDI to the baseline result of the CPDI, and
determine whether the comparison result of the CPDI is identical to the baseline result of the CPDI.

5. A computer program product for reducing clock power consumption of a computer processor, the computer program product comprising:
a non-transitory, computer-readable storage medium; and
computer-readable program code embodied in the storage medium, wherein the computer-readable program code is configured to, when executed by a processor, cause the processor to:
perform a baseline simulation of a computer processor design using a software model of the computer processor design, by the program code being further configured to cause the processor to:
simulate performance of a computer processor design instruction (CPDI) by the computer processor design, to produce a baseline result of the CPDI; and
identify a circuit of the computer processor design that receives a clock signal during performance of the CPDI; and
perform a comparison simulation of the computer processor design using the software model of the computer processor design, by the program code being further configured to cause the processor to:
simulate performance of the CPDI by the computer processor design while injecting a corruption signal into the circuit; and
produce a comparison result of the CPDI; and
designate the circuit for clock gating when processing the CPDI, if the comparison result of the CPDI is identical to the baseline result of the CPDI;
wherein:
a corruption signal set comprises corruption signal elements that are a width of the data bus, the corruption signal set comprising:
a first corruption signal element comprising an alternating set of 0s and 1s beginning with 0;
a second corruption signal element comprising an alternating set of 0s and is beginning with 1;
a third corruption signal element comprising all 0s; and
a fourth corruption signal element comprising all 1s;
the computer processor simulator is configured to perform multiple iterations of the comparison simulation using each of the corruption signal elements of the corruption signal set; and
in each of the iterations, a different corruption signal in the corruption signal set is injected into the circuit; and
the simulator processor is further configured to designate the circuit for clock gating when processing the CPDI when the comparison result of the CPDI is identical to the baseline result of the CPDI for each of the iterations using each of the corruption signal elements in the corruption signal set.

6. The computer program product of claim 5, wherein the computer-readable program code is configured to perform multiple iterations of the baseline and comparison simulations for a corresponding plurality of different CPDIs.

7. The computer program product of claim 5, wherein the computer-readable program code is configured to analyze the software model of the computer processor design and to identify in the software model any circuit configured to receive a clock signal.

8. The computer program product of claim 5, wherein the computer-readable program code is further configured to:
compare the comparison result of the CPDI to the baseline result of the CPDI, and
determine whether the comparison result of the CPDI is identical to the baseline result of the CPDI.

\* \* \* \* \*